No. 881,687. PATENTED MAR. 10, 1908.
L. B. HOFFNER.
VALVE.
APPLICATION FILED MAY 7, 1906.
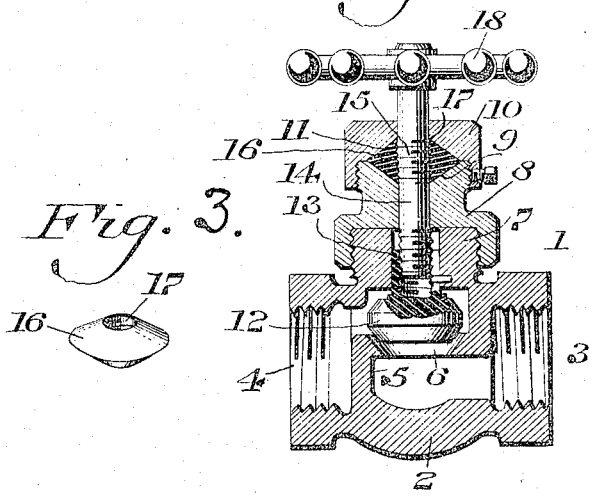
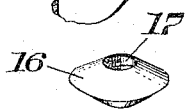
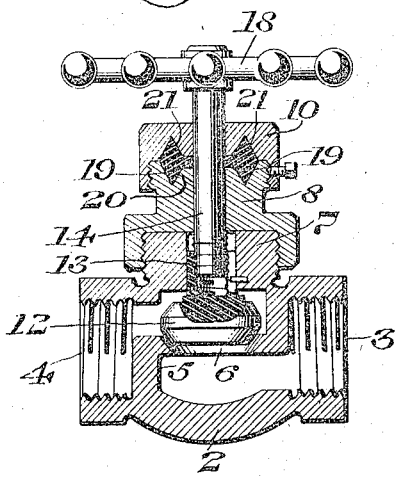
Witnesses
P. F. Nagle.
L. Douville.
Inventor
Louis B. Hoffner.
By Biedersheim & Fairbanks
Attorneys

UNITED STATES PATENT OFFICE.

LOUIS B. HOFFNER, OF PHILADELPHIA, PENNSYLVANIA, ASSIGNOR OF ONE-HALF TO ROBERT D. WORK, OF PHILADELPHIA, PENNSYLVANIA.

VALVE.

No. 881,687.   Specification of Letters Patent.   Patented March 10, 1908.

Application filed May 7, 1906. Serial No. 315,502.

*To all whom it may concern:*

Be it known that I, LOUIS B. HOFFNER, a citizen of the United States, residing in the city and county of Philadelphia, State of Pennsylvania, have invented a new and useful Valve, of which the following is a specification.

My invention relates to new and useful valves wherein I provide a joint to prevent leakage. The valve is of that type wherein the stem is rotating and non-reciprocating and the valve head is reciprocating but non-rotary.

It further consists of other novel features of construction, all as will be hereinafter fully set forth.

Figure 1 represents a vertical sectional view of a valve embodying my invention. Fig. 2 represents a sectional view showing the invention in a slightly different form from that shown in Fig. 1. Figs. 3 and 4 represent perspective views of washers employed.

Similar numerals of reference indicate corresponding parts in the figures.

Referring to the drawings:—1 designates a valve having a body 2 provided with the inlet opening 3 and outlet opening 4, said casing having a partition 5 therein, in which is the port 6 to permit passage of the fluid therethrough.

7 designates a threaded boss on the casing with which the bonnet 8 is adapted to engage, the latter having suitable threads for that purpose, and said boss 7 having an opening therethrough of larger diameter than the opening in the bonnet. The upper face of the bonnet is made with the inclined walls 9, which it will be noted in Fig. 1, are inclined towards each other.

10 designates a cap which is secured in any suitable manner to the bonnet 8 and which is provided with the inclined walls 11 which with the inclined walls 9, form a seat when the parts are in assembled position.

12 designates a valve which is adapted to control the port 6, said valve having the threaded sleeve 13 integral with or connected thereto and which engages with the threaded end of the stem 14, the latter passing through the opening in the bonnet 8 and having the threads 15 thereon.

16 designates a washer having a threaded bore 17, which is adapted to engage with the threads 15 on the stem 14. It will be noted that said washer 16 is of such a form and shape as to fill the opening or seat formed between the bonnet 8 and cap 10, it being noted that the walls of the washer are inclined in order to form a ground joint with the inclined walls 9 and 11 of the said bonnet, and cap respectively.

It will be noted that the upper portion of the valve head is adapted to contact with the lower part of the boss in order to form a ground joint from between when the valve is raised, thus assisting in preventing leakage, as is evident.

18 designates a hand wheel for operating the stem.

It will be seen that when the stem 14 is rotated the valve is raised and lowered in order to open or close the port 6 of the valve. No vertical movement of the stem occurs since it is attached to the washer and the latter is confined between the bonnet and the cap. Also leakage is thus prevented.

In the construction shown in Fig. 2 the parts are the same as already described excepting that in this construction I have made a double ground joint by forming double inclined walls 19 and 20 in the upper face of the bonnet 8 and corresponding faces 21 in the cap 10, the washer in this instance, acting in the same manner as that already described with respect to the washer 16, but being so formed as to fill the space formed by the inclined walls which latter serve as the ground seat for the washer.

It will be evident that various changes may be made by those skilled in the art which will come within the scope of my invention, and I do not, therefore, desire to be limited in every instance, to the exact construction herein shown and described.

Having thus described my invention, what I claim as new and desire to secure by Letters Patent, is:—

1. In a valve, a body, a boss thereon having an opening communicating with the discharge opening of the valve, a valve controlling the port in said body and having a portion thereof filling said opening, and a portion forming a ground joint with the lower wall of said boss, a stem in suitable engagement with the said valve and adapted to raise and lower the same, a bonnet connected with said boss having a depressed seat in its upper wall, a cap adapted to be secured to said bonnet and having a seat reversely situated with respect to the seat in said bonnet, and a ground washer connected with said stem, and rotatable therewith whereby no vertical movement of the stem is permitted and leakage is prevented.

2. In a device of the character described, a body, a boss thereon having an opening communicating with the discharge end of the body, a valve controlling a port in said body, and forming a ground joint with the lower wall of said boss when raised, a stem in suitable engagement with said valve for raising and lowering the same, a bonnet connected with said body and having double inclined walls in its upper face, a cap adapted to be secured to said bonnet and having double inclined walls in its lower face, and a washer having reversely inclined faces adapted to be seated against the inclined walls of said bonnet and cap, and forming at all times therewith, a double ground joint.

3. In a device of the character described, a body, a boss thereon, having an opening therethrough, a valve for controlling the port in said body, a stem having the threaded end engaging with said valve whereby the rotation of said stem raises and lowers said valve, a bonnet in suitable engagement with said boss, inclined walls in the upper portion of said bonnet, a cap adapted to be suitably connected with said bonnet and having walls inclined reversely from that in the upper portion on said bonnet, a threaded portion on said stem and a washer engaging with said threaded portion and adapted to completely fill the space formed by said inclined wall.

4. In a device of the character described, a body, a boss thereon having an opening communicating with the discharge end of the body, a valve controlling the port in said body and forming a ground joint with the lower wall of said boss, when raised, a stem in suitable engagement with said valve for raising and lowering the same, a bonnet connected with said body and having a depressed seat in its upper wall, a ground washer connected with said stem and seated in said depressed seat and a cap adapted to be secured to said bonnet and adapted to hold said ground washer in position whereby no vertical movement of the stem is permitted and leakage is prevented.

5. In a device of the character described, a boss having an opening communicating with the discharge end thereof, a valve controlling the port in said body, a stem in suitable engagement with said valve for raising and lowering the same, a bonnet connected with said body and having double inclined walls in its upper face, a cap adapted to be secured to said bonnet and having double inclined walls in its lower face, and a washer having reversely inclined faces adapted to be seated against the inclined walls of said bonnet and cap and forming at all times therewith a double ground joint.

LOUIS B. HOFFNER.

Witnesses:
WILLIAM LORENZ,
BEACH V. ROOT